Jan. 15, 1963     E. D. BROWN ET AL     3,073,119
ROCKET PROPELLANT SYSTEM
Filed Dec. 8, 1958
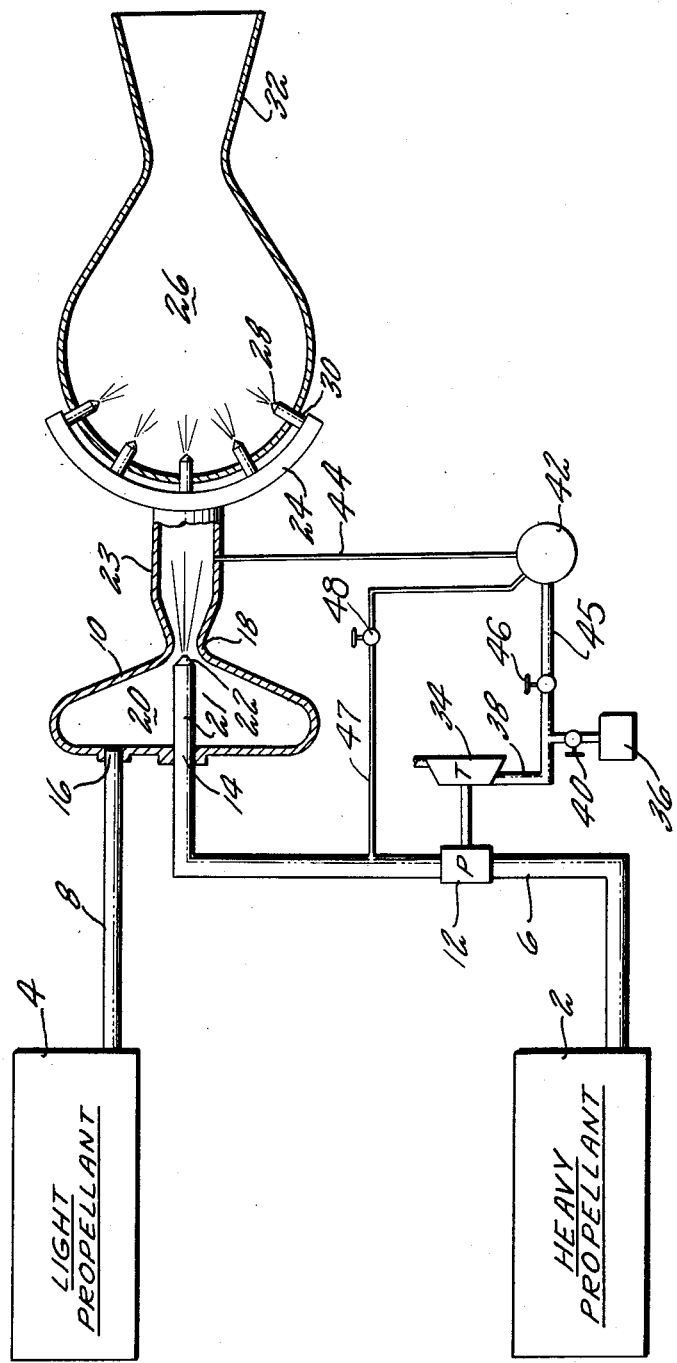
INVENTORS
EDMUND D. BROWN
JOHN R. FOLEY
BY *Charles A. Warren*
ATTORNEY 3,073,119
ROCKET PROPELLANT SYSTEM
Edmund D. Brown, South Glastonbury, and John R. Foley, Manchester, Conn., assignors to United Aircraft Corporation, East Hartford, Conn., a corporation of Delaware
Filed Dec. 8, 1958, Ser. No. 778,827
2 Claims. (Cl. 60—39.28)

This invention relates to a rocket system utilizing two liquid propellants.

The use of two propellants for a rocket normally requires two supply pumps, one for each propellant, and an arrangement for driving the pumps to deliver the proper proportion of the two propellants to the combustion chamber. One feature of the invention is an arrangement by which both propellants may be supplied by a single pump. Another feature is the use of an ejector device for mixing the propellants under pressure for delivery to the combustion chamber.

Other features and advantages will be apparent from the specification and claims, and from the accompanying drawing which illustrates an embodiment of the invention.

The single FIGURE is a diagrammatic view of the propellant system.

The system is intended to use two propellants, one of which would normally be heavier than the other, although both would normally be liquid at least until they are discharged into the combustion or decomposition chamber. The schematic drawing shows two propellant sources in the form of tanks 2 and 4, one for each of the propellants and conduits 6 and 8 from the tanks to an ejector 10. The tank 2 has the heavier propellant and the conduit 6 from this tank has a pressure pump 12 therein for delivery of the heavier propellant under pressure to the pressure connection or inlet 14 on the ejector.

The conduit 8 from tank 4 is connected to the suction connection or inlet 16 on the ejector. The ejector is of conventional construction in that the interior thereof is shaped to form a throat 18 and a chamber 20 upstream of the throat with which the suction inlet 16 communicates. The pressure inlet 14 includes a tube 21 within the chamber having a nozzle 22 adjacent to the throat for the discharge of propellant under pressure in a downstream direction at that point.

Downstream of the throat the ejector outlet 23 is connected to a propellant manifold 24. The latter receives the mixed propellants, which together form a combustible mixture, from the ejector and the mixed propellants are discharged into the combustion chamber 26 of the rocket through propellant injectors 28 communicating by short conduits 30 extending through the combustion chamber wall with the manifold 24.

As combustion takes place the products of the combustion process are discharged through the thrust nozzle 32 communicating with the combustion chamber.

The pressure pump, above described, may be driven by any suitable mechanism, such as a gas turbine 34 which receives gas under pressure for starting from a pressure source 36 through a conduit 38 with a control valve 40 therein. After starting, the turbine is driven by gas from a gas generator or combustor 42 supplied with a combustible mixture from outlet 23 through a conduit 44. The combustor 42 is connected to conduit 38 by a conduit 45 which has a valve 46 to prevent flow into the combustor 42 from the source 36 during starting. A propellant conduit 47 from downstream of the pump 12 to the combustor 42 permits the addition of heavy propellant to the mixture in the combustor for the purpose of controlling the temperature of the gas driving the turbine. A valve 48 may be used to control the propellant flow through conduit 47.

In operation, the pump is started by opening valve 40 with valve 46 closed. This starts the turbine 34 to drive the pump thereby delivering heavy propellant to the nozzle 22. The discharge of this propellant into the throat develops a suction in chamber 20 to draw propellant from tank 4 into the chamber and thence through the throat 18 to mix with the heavy propellant in the outlet 23. The mixed propellants are discharged into the rocket chamber 26 where combustion or decomposition takes place and gas under pressure is generated for discharge through the thrust nozzle. When decomposition is stabilized valve 40 is closed and valve 46 is opened so that a small portion of the gas from the chamber 23 continues to drive the turbine through the remainder of the operating cycle.

It is to be understood that the invention is not limited to the specific embodiment herein illustrated and described, but may be used in other ways without departure from its spirit as defined by the following claims.

We claim:

1. In a propellant system, first and second supply ducts, one for each of two propellants, a pump in the first of said ducts for delivering the propellant in said duct under pressure, a turbine for driving said pump, an ejector having a pressure inlet, a suction inlet and an outlet chamber, said first duct being connected to said pressure inlet for delivering propellant under the discharge pressure from said pump, a connection from said second duct to said suction inlet, a combustion chamber having a generally spherical wall and propellant nozzles extending radially through the wall thereof, an arcuate manifold external of said combustion chamber wall having fluid connections to said propellant nozzles, a fluid connection from said ejector outlet chamber to said manifold, a combustor for driving said turbine supplied with a combustible mixture from the outlet chamber of the ejector, said combustor having two inlets and an outlet, a conduit connecting the combustor outlet with the turbine inlet, a second conduit connecting one of said inlets with said ejector outlet chamber, and a third conduit connecting said combustor with the propellant discharge from said pump.

2. In a propellant system, first and second supply ducts, one for each of two propellants, a pump in the first of said ducts for delivering the propellant in said duct under pressure, a turbine for driving said pump, an ejector having a pressure inlet, a suction inlet and an outlet chamber, said first duct being connected to said pressure inlet for delivering propellant under the discharge pressure from said pump, a connection from said second duct to said suction inlet, a combustion chamber having a generally spherical wall and propellant nozzles extending radially through the wall thereof, an arcuate manifold external of said combustion chamber wall having fluid connections to said propellant nozzles, a fluid connection from said ejector outlet chamber to said manifold, a combustor for driving said turbine supplied with a combustible mixture from the outlet chamber of the ejector, said combustor having two inlets and an outlet, a conduit connecting the combustor outlet with the turbine inlet, a second conduit connecting one of said inlets with said ejector outlet chamber, a third conduit connecting said combustor with the propellant discharge from said pump, and a valve in said third conduit for varying the temperature of the gas driving the turbine by controlling the amount of propellant supplied to said combustor through said third conduit.

(References on following page)

References Cited in the file of this patent

UNITED STATES PATENTS

| | | |
|---|---|---|
| 2,395,114 | Goddard | Feb. 19, 1946 |
| 2,450,950 | Goddard | Oct. 12, 1948 |
| 2,502,332 | McCollum | Mar. 28, 1950 |
| 2,542,953 | Williams | Feb. 20, 1951 |
| 2,555,081 | Goddard | May 29, 1951 |
| 2,558,483 | Goddard | June 26, 1951 |
| 2,704,438 | Sheets | Mar. 22, 1955 |
| 2,741,085 | Prentiss | Apr. 10, 1956 |
| 2,827,759 | Bruckman | Mar. 25, 1958 |
| 2,857,204 | Gross | Oct. 21, 1958 |
| 2,968,152 | Moore | Jan. 17, 1961 |